United States Patent
Saunders et al.

(10) Patent No.: US 10,691,780 B2
(45) Date of Patent: Jun. 23, 2020

(54) METHODS AND APPARATUS FOR AUTHENTICATION IN AN ELECTRONIC DEVICE

(71) Applicant: Cirrus Logic International Semiconductor Ltd., Edinburgh (GB)

(72) Inventors: Sunil Saunders, Oxford (GB); Robert David Rand, Scottish Borders (GB); Robert James Hatfield, Edinburgh (GB); John Laurence Pennock, Midlothian (GB)

(73) Assignee: Cirrus Logic, Inc., Austin, TX (US)

( * ) Notice: Subject to any disclaimer, the term of this patent is extended or adjusted under 35 U.S.C. 154(b) by 62 days.

(21) Appl. No.: 15/667,849

(22) Filed: Aug. 3, 2017

(65) Prior Publication Data

US 2018/0039769 A1 Feb. 8, 2018

Related U.S. Application Data

(60) Provisional application No. 62/370,474, filed on Aug. 3, 2016.

(51) Int. Cl.
*G06F 21/32* (2013.01)
*H04W 12/06* (2009.01)
(Continued)

(52) U.S. Cl.
CPC ............ *G06F 21/32* (2013.01); *G06F 1/3231* (2013.01); *G06K 9/00885* (2013.01); *G06K 9/62* (2013.01);
(Continued)

(58) Field of Classification Search
None
See application file for complete search history.

(56) References Cited

U.S. PATENT DOCUMENTS 6,691,089 B1    2/2004   Su et al.
10,075,437 B1 * 9/2018   Costigan ............... H04L 9/3242
(Continued)

FOREIGN PATENT DOCUMENTS

EP    1521161 A2   4/2005
EP    3026667 A1   6/2016
(Continued)

OTHER PUBLICATIONS

Andreou, "Chapter 1 Switch-based logic functions", Retrieved from the Internet: <URL: https://web.archive.org/web/20150629212237/ https://www.ece.jhu.edu/~andreou/216/Archives/2014/Handouts/POP_Ch1-2.pdf> (Year: 2015).*

(Continued)

*Primary Examiner* — Jiangeng Sun
(74) *Attorney, Agent, or Firm* — Jackson Walker L.L.P.

(57) ABSTRACT

An electronic device, comprising one or more input devices, for receiving biometric input from a user and generating one or more biometric input signals; an applications processor; a mixer configurable by the applications processor to provide a first signal path between one or more of the input devices and the applications processor; and a biometric authentication module coupled to the one or more input devices via a second signal path that does not include the mixer, for performing authentication of at least one of the one or more biometric input signals.

52 Claims, 4 Drawing Sheets

(51) Int. Cl.
*H04L 29/06* (2006.01)
*G06F 1/3231* (2019.01)
*G06K 9/00* (2006.01)
*G06K 9/62* (2006.01)
*G10L 17/22* (2013.01)
*G06F 3/16* (2006.01)
*G06K 9/68* (2006.01)
*G10L 17/02* (2013.01)

(52) U.S. Cl.
CPC .......... *G10L 17/22* (2013.01); *H04L 63/0861* (2013.01); *H04W 12/06* (2013.01); *G06F 3/167* (2013.01); *G06K 9/6857* (2013.01); *G10L 17/02* (2013.01); *H04M 2250/74* (2013.01)

(56) References Cited

U.S. PATENT DOCUMENTS

| | | | |
|---|---|---|---|
| 2002/0174348 | A1 | 11/2002 | Ting |
| 2003/0163739 | A1 | 8/2003 | Armington et al. |
| 2005/0071635 | A1 | 3/2005 | Furuyama |
| 2006/0020792 | A1 | 1/2006 | Weiss |
| 2007/0281761 | A1 | 12/2007 | Kim |
| 2009/0005891 | A1 | 1/2009 | Batson et al. |
| 2009/0238418 | A1 | 9/2009 | Sato |
| 2013/0226586 | A1 | 8/2013 | Jang et al. |
| 2013/0246800 | A1 | 9/2013 | Stewart |
| 2015/0035643 | A1 | 2/2015 | Kursun |
| 2015/0088509 | A1 | 3/2015 | Gimenez et al. |
| 2015/0161370 | A1 | 6/2015 | North et al. |
| 2015/0332057 | A1 | 11/2015 | Chang et al. |
| 2016/0005038 | A1* | 1/2016 | Kamal ............... G06Q 20/3223 705/44 |
| 2016/0087976 | A1 | 3/2016 | Kaplan et al. |
| 2016/0094338 | A1 | 3/2016 | Pappachan et al. |
| 2016/0324478 | A1* | 11/2016 | Goldstein ............... A61B 5/721 |
| 2016/0364559 | A1 | 12/2016 | Bali et al. |
| 2017/0180386 | A1 | 6/2017 | Dewan et al. |

FOREIGN PATENT DOCUMENTS

| | | |
|---|---|---|
| GB | 2388947 A | 11/2003 |
| WO | 9900720 A2 | 1/1999 |
| WO | 0232308 A1 | 4/2002 |
| WO | 2008111340 A1 | 9/2008 |
| WO | 2010066269 A1 | 6/2010 |
| WO | 2016200523 A1 | 12/2016 |

OTHER PUBLICATIONS

Margaret Rouse, "FIDO (Fast Identity Online)", Retrieved from the Internet: <URL: https://web.archive.org/web/20150418061110/https://searchsecurity.techtarget.com/definition/FIDO-Fast-Identity-Online> (Year: 2015).*
International Search Report and Written Opinion of the International Searching Authority, International Application No. PCT/GB2017/052249, dated Dec. 6, 2017.
Combined Search and Examination Report under Sections 17 and 18(3), Application No. GB1616899.9, dated Apr. 5, 2017.
Search Report under Section 17(6), Application No. GB1616899.9, Claims 47-52, dated Jul. 26, 2017.
Search Report under Section 17(6), Application No. GB1616899.9, Claims 18-31, dated Jul. 26, 2017.
Search Report under Section 17, UKIPO, Application No. gb1621717.6, dated Jun. 14, 2017.
International Search Report and Written Opinion of the International Searching Authority, International Application No. PCT/GB2017/053328, dated Jan. 25, 2018.
Combined Search and Examination Report under Sections 17 and 18(3), UKIPO, Application No. GB1715273.7, dated Feb. 21, 2018.
International Search Report and Written Opinion of the International Searching Authority, International Application No. PCT/GB2017/052251, dated Nov. 23, 2017.
Combined Search and Examination Report under Sections 17 and 18(3), UKIPO, Application No. GB1616897.3, dated Apr. 5, 2017.
Search and Examination Report under Sections 17 and 18(3), UKIPO, Application No. GB1616897.3, dated Jul. 26, 2017.

* cited by examiner

METHODS AND APPARATUS FOR AUTHENTICATION IN AN ELECTRONIC DEVICE

TECHNICAL FIELD

Examples of the present disclosure relate to methods and apparatus for biometric authentication in an electronic device, and particularly relate to methods and apparatus for authenticating the voice of a user of an electronic device.

BACKGROUND

The growing demand for more secure, more reliable and more convenient user authentication solutions for mobile devices is accepted and publicized in the industry.

It is expected that biometrics will replace passwords, particularly on mobile platforms, as long passwords are difficult to remember and difficult to type on such devices. For example, in order to improve user experience, many manufacturers of mobile phones have embedded fingerprint sensors in their recent devices, and it is expected that users will increasingly adopt biometrics in order to access their device and/or specific functions thereon. Other types of biometric authentication include iris recognition and voice recognition. Multiple different types of authentication (e.g. passwords, fingerprint/iris/voice recognition, etc) may be combined in order to increase the security of a particular operation.

While the use of biometrics in general increases the security of a particular operation, by ensuring the person requesting that the operation be carried out is a registered user of that device, biometric solutions are not invulnerable to attacks from third parties. For example, a fingerprint of a particular user may be stolen (e.g. "lifted" from an object the user has touched) by a third party intent on using that fingerprint to access the user's device. The user's voice may be recorded by a third party and played back to the device in order to bypass voice biometric security. A picture of the user's iris may be acquired and used to bypass iris recognition software.

All of these techniques require significant effort on the part of the third party attempting to gain access to the user's device. Further, even if successful, the techniques allow that third party access to just a single device at a time. A more modern technique for bypassing biometric security systems, requiring fewer resources and scalable to multiple devices at a time, may involve the surreptitious installation of malware on the user's device. For example, such malware may be able to bypass or otherwise prevent security processes from functioning effectively, and thus allow the third-party attacker access to the devices on which it is installed.

A mechanism is therefore required to defend biometric authentication systems against such software-based attacks.

SUMMARY

According to one aspect, there is provided an electronic device, comprising: one or more input devices, for receiving biometric input from a user and generating one or more biometric input signals; an applications processor; a mixer configurable by the applications processor to provide a first signal path between one or more of the input devices and the applications processor; and a biometric authentication module coupled to the one or more input devices via a second signal path that does not include the mixer, for performing authentication of at least one of the one or more biometric input signals.

According to a further aspect, the disclosure provides a method in an electronic device, comprising: receiving biometric input from a user at one or more input devices of the electronic device and generating one or more biometric input signals; providing a first signal path between one or more of the input devices and an applications processor of the electronic device; providing a second signal path between one or more of the input devices and a biometric authentication module of the electronic device; and, in the biometric authentication module, performing authentication of at least one of the one or more biometric input signals, wherein the second signal path is configured such that a signal received at an input of the biometric authentication module is based solely on the at least one of the one or more biometric input signals.

Another aspect provides an integrated circuit comprising: a first set of one or more inputs for receiving biometric input signals from one or more input devices; a second set of one or more inputs for receiving other input signals; a first data interface, coupled to both sets of inputs via a first, configurable signal path, for outputting the biometric input signals or the other input signals from the integrated circuit; and a second data interface, coupled to the first set of inputs via a second signal path, for outputting only the biometric input signals from the integrated circuit.

A further aspect provides an electronic device comprising: an integrated circuit as set out above; one or more input devices, for receiving biometric input from a user and generating the biometric input signals, said input devices coupled to one or more of the first set of inputs; and a processor comprising a biometric authentication module, the biometric authentication module configured to perform authentication only on the biometric input signals received via the second data interface, or signals derived therefrom.

Another aspect of the disclosure provides a method in an integrated circuit, comprising: receiving biometric input signals from one or more input devices on a first set of one or more inputs; receiving other input signals on a second set of one or more inputs; outputting the biometric input signals or the other input signals from the integrated circuit via a first data interface, coupled to both sets of inputs via a first, configurable signal path; and outputting only the biometric input signals from the integrated circuit via a second data interface, coupled to the first set of inputs via a second signal path.

A further aspect of the disclosure provides a speaker recognition processor comprising: one or more inputs for receiving voice biometric input signals from one or more microphones; a data interface, coupled to the one or more inputs via a first, configurable signal path, for outputting the voice biometric input signals from the speech recognition processor to a processor; and a voice biometric authentication module, coupled to the one or more inputs via a second, signal path, for performing authentication only on voice biometric input signals received at the one or more inputs, or signals derived therefrom.

Another aspect provides an electronic device comprising: a speaker recognition processor as set out above; one or more microphones, for receiving voice input from a user and generating the voice biometric input signals; and a processor coupled to the data interface.

A yet further aspect provides a method in a speaker recognition processor, comprising: receiving voice biometric input signals from one or more microphones via one or more inputs; outputting the voice biometric input signals from the speech recognition processor to a processor via a data interface, coupled to the one or more inputs via a first, configurable signal path; and performing authentication only on voice biometric input signals received at the one or more inputs, or signals derived therefrom, in a voice biometric authentication module coupled to the one or more inputs via a second signal path.

Another aspect of the disclosure provides an integrated circuit comprising: one or more inputs for receiving biometric input signals; a biometric authentication module, coupled to the one or more inputs via a first signal path, for performing authentication on the biometric input signals or signals derived therefrom; and a command input, configured to disable all signal paths to the biometric authentication module with the exception of the first signal path upon entry to a biometric authentication mode.

Another aspect provides an electronic device comprising: an integrated circuit as set out above; one or more input devices, for receiving biometric input from a user and generating the biometric input signals; and a processor coupled to the data interface.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
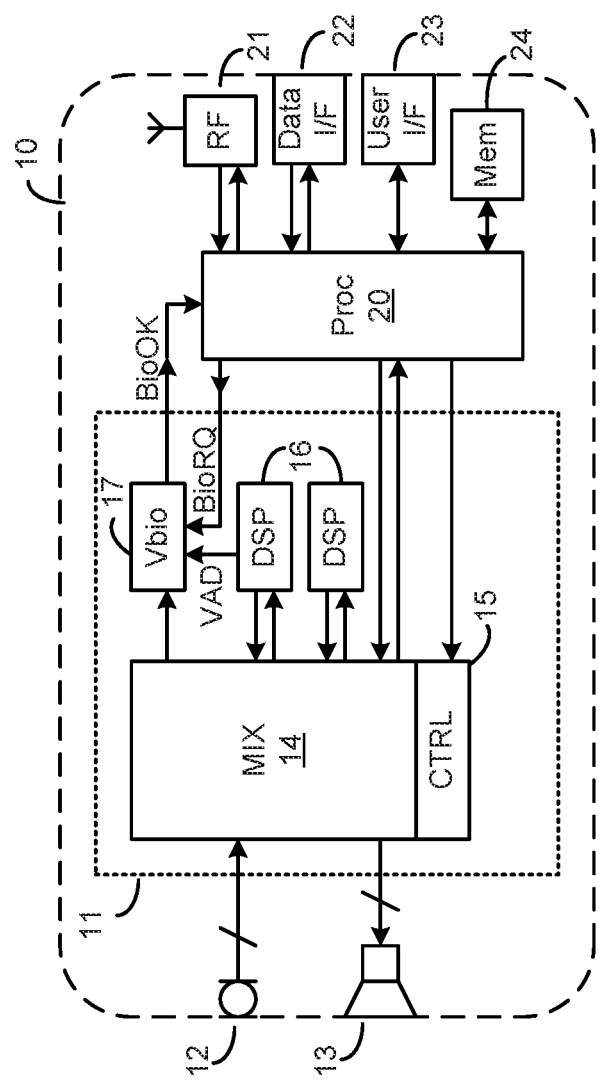
FIG. 1 shows an example of an electronic device.

FIG. 1 shows an example of an electronic device 10, which may for example be a mobile telephone or a mobile computing device such as laptop or tablet computer. The device comprises one or more microphones 12 for receiving voice input from the user, processing circuitry 11 connected to the microphones 12, and a processor 20 which may be termed a control processor or applications processor (AP) connected to the processing circuitry 11.

The device 10 may also comprise one or more radio-frequency modems 21 for bidirectional communication with a local wireless network or a telecommunications network. The device 10 may also comprise other data interfaces 22 which may carry audio data, for example a USB (Universal Serial Bus) connection. The modems 21 or interfaces 22 are coupled to the control processor 20 and thus audio data may be communicated in to or out of the device via the processor 20. The control processor 20 may also be coupled to some local memory 24 which may store audio data for recording or playback.

Electronic devices may have a plurality of functional modes or "use cases". These may be controlled by application software stored in the memory 24 and executed by the processor 20 in response to user input received via a user interface 23 on the device 10, for example a keypad or touch-screen, also coupled to the processor 20.

The microphones 12 receive voice input from a user and generate microphone audio data representing the voice input. In some examples, the device 10 may comprise one or more loudspeakers 13 for receiving speaker audio data (e.g. via the processing circuitry 11) and outputting corresponding acoustic signals.

The processing circuitry 11 is thus provided with inputs and outputs for passing audio data signals between the microphones 12 and the control processor 20 (or another audio sink in the device 10), and between the control processor 20 and the loudspeakers 13 (or another transducer which may be present). The processing circuitry 11 may also comprise one or more digital signal processors (DSPs) 16 for processing audio data.

The processing circuitry 11 further comprises a mixer 14 for routing signals between components of the device 10 coupled to the mixer, for example microphones 12, speakers 13, DSPs 16 and the control processor 20.

The mixer 14 is operative to provide on one or more mixer outputs a stream of audio data derived from a single mixer input (or respective streams of audio data derived from respective single mixer inputs) or derived from a selected mix of input audio data from two or more mixer inputs. For example, the mixer 14 may be configurable to apply respective defined gains to individual input or output audio data streams. The mixer is configured thus by control circuitry 15, which may for example comprise a set of registers for storing configuration parameters for each selected path or mix or gain. For example, for each mixer output, the control circuitry 15 may configure the identity of each contributing input and may also configure a respective gain to be applied to each input path or to the combined signal.

The digital signal processors (DSPs) 16 are operable to receive audio data from the microphones, process the data, and deliver the processed data back to the mixer 14 for forwarding to other components of the device 10. The DSPs 16 may be operable to implement algorithms that may be required by the device 10, such as noise reduction techniques to mitigate or cancel background noise and so increase the signal-to-noise ratio of the audio data. The present disclosure is not limited in this respect, however, and those skilled in the art will appreciate that this is but one example of an algorithm that may be applied in the DSPs 16.

Similarly, the control processor 20 may receive audio data from modems 21, interface 22 or local memory 24 and pass it via the mixer 14 and possibly via DSPs 16 for enhancement before outputting via the mixer 14 to speakers 13.

The signal paths and gains to be applied within the mixer 14 depend on the current functionality or "use case" required of the device 10, as defined above. These use cases may be controlled by application software running on the processor 20, for example in response to user input received via the user interface 23, and thus the control circuitry 15 may be controlled by the control processor 20.

The processing circuitry 11 may also comprise a voice biometric authentication module 17 for analyzing audio data received from the one or more of the microphones 12 and providing a speaker authentication result BioOK to the control processor 20.

The voice biometric authentication module 17 may be activated according to a control input conveying a request BioRQ for voice biometric authentication from the control processor 20. For example, a particular use case running on the control processor 20 may require authentication to wake the device 10, or to authorize some financial transaction. The voice biometric authentication module 17 thus receives input audio data from the microphones 12 via the mixer 14, and compares characteristics of the audio data with user-specific reference templates specific to a respective pre-registered authorized user (and maybe also reference templates representative of a general population). Voice recognition techniques and algorithms are well known to those skilled in the art and the present disclosure is not limited to any particular voice recognition technique or algorithm. If the received data corresponds to an authorized user, the module 17 indicates this positive authentication result by a signal BioOK which is sent to the control processor 20. The control processor 20 (or a remote server that has requested the authentication) may then act on the signal as appropriate, for example, by authorizing some activity that required the authentication, e.g. a financial transaction. If the authentication result were negative, the financial transaction would not be authorised.

In some embodiments the voice biometric authentication module 17 may be enabled by a voice activity event detected, for example by one of the DSPs 16 or another dedicated module. For example, when the device 10 is in a low-power sleep mode, the voice activity may be detected and a signal VAD (voice activity detected) communicated to the biometric authentication module 17. In the event of a positive user authentication, the signal BioOK may be used by the control processor 20 to alter the state of the device 10 from the low-power sleep mode to an active mode (i.e. higher power). If the authentication result were negative, the mode change would not be activated.

The processing circuitry 11 comprising a voice biometric authentication module 17 for analyzing received audio data and providing a speaker authentication result BioOK may in some embodiments be implemented as a single integrated circuit, which may thus be termed a Speaker Recognition Processor (SRP). Locating the voice biometric authentication on the integrated SRP 11, together with the mixer 14 controlling its input data and any pre-conditioning by DSPs 16, results in a system in which the entire biometric verification process is implemented on one integrated circuit, in contrast to other potential system architectures in which at least part of the biometric authentication occurs on a control processor similar to processor 20.

A control processor may typically run multiple application processes, some of which may have been uploaded from outside sources by the end user directly into the processor 20 and associated memory 24 via the data interface 22 or wireless link 21 for example. This provides a route for malicious software (malware) to be uploaded and installed surreptitiously, and for this malware to corrupt the operation of the biometric authentication. There are possible countermeasures to mitigate this risk, for example using a Trusted Execution Zone with carefully protected access and execution features, but it is much more reliable to secure the processing hardware and software by integrating them on a physically separate integrated circuit with a processor and associated program and data storage dedicated to processes associated with the biometric authentication.

Also, in the device 10 of FIG. 1, the audio data stream used for biometric authentication never leaves the SRP 11, making it harder for investigators to reverse engineer the authentication algorithm. Also any signal conditioning of the microphone input signal by the DSPs 16, possibly time-varying or adaptive (e.g. spectral equalization), may be conveniently taken into account locally on-chip by the biometric authentication algorithm.

Co-integrating the voice biometric authentication module 17 on the SRP 11 has a further advantage in embodiments requiring authentication to "wake" the device 10 from a low-power mode, as discussed above. Until a positive biometric authorization occurs at least part of the control processor 20 may be in a low-power dormant state. By locating the voice biometric authentication module 17 in the SRP 11, outside the control processor 20, the control processor 20 may be in a lower-power state than would otherwise be the case. Further, the biometric authentication module 17 may also be placed in a low-power state until voice activity detection circuitry on SRP 11, such as the DSP 16 (or other upstream or parallel voice activity detection circuitry), detects the presence of voice activity in the microphone signal.

However, a problem that may still remain with the device 10 as illustrated in FIG. 1 is the potential for malware to record audio data acquired by the microphones 12 and use this later to "spoof" the biometric authentication module 17. For example, the malware may run in an insecure area of the control processor 20 and, during a genuine authentication event, configure the mixer 14, via the control circuitry 15, to pass a copy of the microphone audio data into storage memory 24. Later, the malware may run again in an insecure area of the control processor 20 and configure the mixer 14 to pass this recorded audio data to the input of the biometric authentication module 17, where it may give a positive authentication result and allow control by the malware of sensitive applications of the device 10.

Similarly, other false audio data may be injected by configuration of the control circuitry by the control processor 20, for example some prior recording or otherwise synthesized speech sample, and succeed in tricking the biometric authentication module 17 into generating a positive biometric result and permitting a restricted operation.

Figure 2:
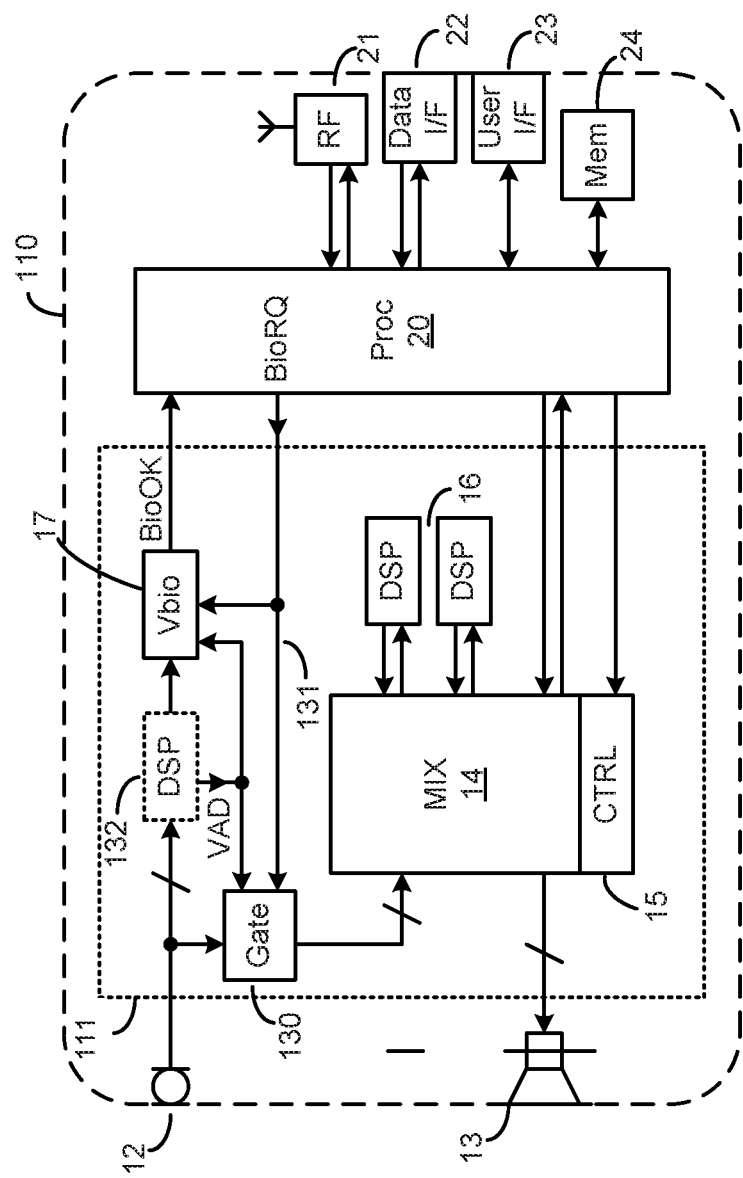
FIG. 2 shows an electronic device according to embodiments of the invention.

FIG. 2 illustrates embodiments of a device 110 intended to overcome these problems.

Similar features are given similar reference numerals and are not further described herein. Thus, in the illustrated embodiment, the device 110 comprises one or more microphones 12, one or more speakers 13, a control processor 20, RF network circuitry 21, one or more data interfaces 22, a user interface 23 and memory 24, connected and operating similarly as described with respect to the device 10 shown in FIG. 1.

The device 110 also comprises a speaker recognition processor (SRP) 111, which in many respects is similar to the SRP 11 described above. The SRP 111 thus comprises a mixer 14, mixer control circuitry 15, DSPs 16, and a voice biometric authentication module 17.

However, in the SRP 111, the signal input to the biometric authentication module 17 passes from the one or more microphones 12 to the biometric authentication module 17 without passing via the mixer 14.

Since the signal input to the biometric authentication module 17 is now coupled to the one or more microphones 12 without passing via the mixer 14, there is no path via the mixer 14, or otherwise, by which audio data may be transferred from the control processor 20, or from any other interface than the microphones, to the audio data input of the biometric authentication module. Thus it is no longer possible for audio data to be injected into the biometric authentication module 17 in an attempt to "spoof" the algorithm. Any required enhancement of the microphone signals prior to biometric authentication or any voice activity detection may now be performed by a DSP 132 placed in the path between the microphones 12 and the biometric authentication module 17. The DSP 132 may be a programmable processor or logic dedicated to particular functions, or a mixture of both programmable and dedicated circuitry.

In some embodiments, one or more components of the microphone signal may pass through other circuitry, for example an external analog-to-digital converter (ADC) or codec, and be received by the SRP 111 at inputs dedicated to such signals. In such embodiments, the user may supply the microphone signals via a suitable codec, as discussed later with respect to FIG. 3*a*. In order to maintain the security of the biometric authentication process, the dedicated inputs should not be connected to other signals, for example output interfaces of the application processor. In this way it is still no longer possible for "spoof" audio data to be injected into the biometric authentication module 17.

The microphones 12 (whether directly connected to the SRP 111 or indirectly as discussed above) are coupled to the mixer 14, but only via a signal gating module 130 which is selectively operative to prevent (i.e. "gate") the microphone signals from reaching the mixer 14. The signal gating module 130 is controlled by one or more control signals on a control link 131. The microphone signals may only pass to the mixer 14 (and from there to other components of the device 110) when the signal gating module 130 is controlled to pass these signals from the microphones to the mixer. In some embodiments, signal gating module 130 may function as a multiplexer or dual-throw switch with output poles coupled to the mixer 14 and biometric authentication module 17 such that only one of the two paths from the microphones 12 to the mixer 14 and from the microphones 12 to the biometric authentication module 17 may be active at any one time, i.e. there is no microphone 12 that can be simultaneously coupled via active signal paths to both the mixer 14 and biometric authentication module 17. Signal gating module 130 may for example be implemented using transmission gate switches, or by equivalent combinatorial logic or by appropriate derivation of memory pointers to point to input and output locations of the data to be routed.

As illustrated in FIG. 2, in some embodiments the signal gating control signal on link 131 may be ganged to (i.e. commensurate with) a signal enabling the biometric authentication module 17. In that way, the signal gating block 130 is configured not to pass any microphone signals to the mixer 14 during an authentication attempt (such that illicit recording of the voice input by malware cannot take place). In some embodiments, the signal enabling the biometric authentication module 17 may be generated by the control processor 20 as an authentication request BioRQ. In some embodiments the biometric authentication module 17 may also be enabled and the control gate closed by other circuitry on the SRP 111, for example, by voice activity detection VAD in DSP 132 or elsewhere, for example for "secure wake" operation.

Alternatively the gating control signal on the control link 131 may be generated separately from the signal enabling the biometric authentication module 17. For example, the gating control signal may be generated in a secure area, for example a Trusted Execution zone in the control processor 20, and thus be inherently safe against user-loaded malware. Alternatively or additionally the gating control signal may be subjected to some signal authentication of its own. For instance, the gating control signal may be signed according to some local cryptographic key. A suitable authentication module may be provided in the control link 131 to receive and authenticate any control signal received on the link 131. Control signals that are not authenticated are not passed to the signal gating block 130 or the biometric authentication module 17.

When biometric authentication is not occurring (i.e. when the device 110 is not in a biometric authentication mode), the microphone signals may be freely used and pass via the mixer 14 and possibly also via one or more DSPs via an audio interface to the control processor 20.

The precise nature of the algorithm carried out in the authentication module 17 is not relevant for a description of the invention, and those skilled in the art will be aware of the principles as well as several algorithms for performing voice biometric authentication. In general, the process may involve a comparison of parameters derived from the acquired (and optionally pre-processed) audio data to corresponding parameters stored in the device 110 after a previous enrolment session with each user to be considered an authorised user. These parameters may for instance be related to Mel-frequency cepstral coefficients (MFCC) of the audio data. As part of the authentication process, the authentication module 17 may also access a universal background model (UBM) and/or a cohort model representing the corresponding parameters of a general population of speakers and previously stored in the device. Thus the authentication module authenticates a user based on a voice biometric signal received from the user.

The biometric authentication result BioOK may be transmitted in some authenticatable form, for instance controlled under a FIDO authentication protocol, so it can pass uncorrupted through the control processor 20 to its eventual destination, which may be a remote server. Alternatively the BioOK signal may be transmitted via a local protocol to activate less critical functions such as device wake-up. In either case, a suitable data authentication module may be provided at the output of the biometric authentication module 17 to receive and apply a suitable data authentication protocol to any biometric authentication result.

Biometric authentication may require substantial computing effort, and thus advantageously may be implemented on small-geometry integrated circuitry. Microphone or speaker interfaces may require analog signal processing, or at least analog-to-digital conversion or digital-to-analog conversion, which is less economic on small-geometry integrated circuitry as analog circuitry does not scale as well as digital. Thus in some embodiments it may be desirable for microphone interface circuitry and signal mixing to occur on separate integrated circuits from the biometric authentication, manufactured on different manufacturing processes. However, even in this instance it may still be advantageous to provide the biometric authentication module on a separate chip from the control processor, for example to mitigate the security and power-up time issues discussed above. This partitioning also allows different codecs of different performance or complexity to be used for different applications with a common SRP, or even for cases where the SRP is co-integrated with control processor 20.

Figure 3A:
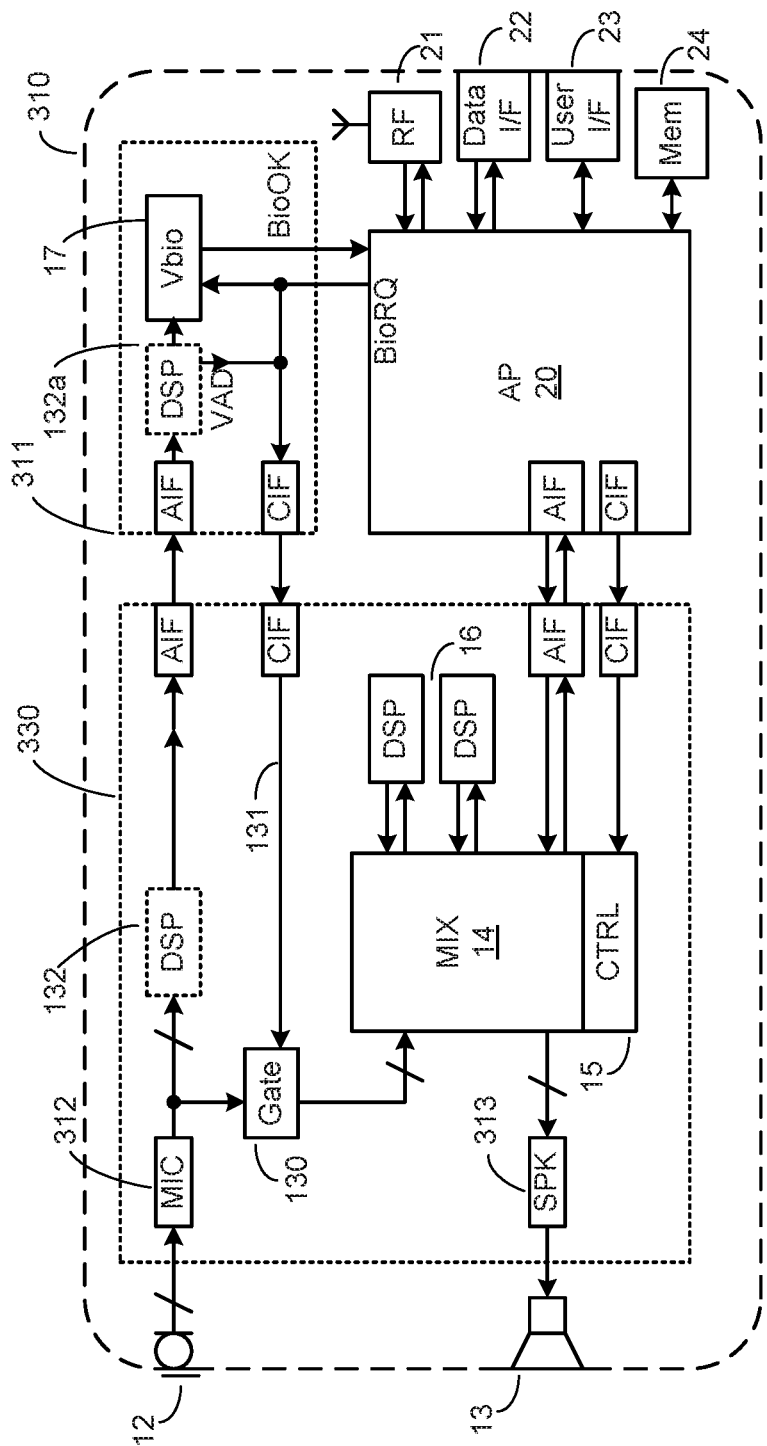
FIGS. 3a and 3b show electronic devices according to further embodiments of the invention.

Thus FIG. 3*a* illustrates further embodiments of a device 310 in which the microphone interface circuitry and biometric authentication are provided on separate integrated circuits. Similar features are given similar reference numerals and are not further described herein. Thus, in the illustrated embodiment, the device 310 comprises one or more microphones 12, one or more speakers 13, a control processor 20, RF network circuitry 21, one or more data interfaces 22, a user interface 23 and memory 24, connected and operating similarly as described with respect to the device shown in FIG. 1.

The device 310 also comprises a codec integrated circuit 330 providing audio interface circuitry and processing, and a speaker recognition processor (SRP) 311 providing biometric authentication. The codec 330 provides signal paths between the microphones 12 and the loudspeakers 13, and the SRP 311 and the control processor 20, while the SRP 311 and the control processor 20 communicate with each other.

The one or more microphones 12 are coupled to the codec 330 via microphone interfaces 312, which may for example comprise suitable clocking arrangements for digital microphones or suitable analogue-to-digital convertors for analogue microphones. The one or more loudspeakers 13 are driven from the codec 330 via speaker interfaces 313, which may for example include suitable digital-to-analogue convertors and linear or switching driver amplifiers. (Embodiments discussed above with respect to the SRP 111 of FIG. 2 may also comprise similar interfaces 312, 313, but these have been omitted from the diagram and discussion for simplicity.)

In the illustrated embodiment, the mixer 14, mixer control circuitry 15, DSPs 16 and signal gating module 130 are integrated onto the codec 330. Thus the mixer control circuitry 15 receives control signals from the control processor 20 via control interfaces (CIFs) in the codec 330 and the control processor 20. The mixer 14 is configured to provide audio output signals to the speaker 13 via the speaker interface 313, and to provide audio signals to, and/or receive audio signals from, the control processor 20 over audio interfaces (AIFs) in the codec 330 and the control processor 20.

The biometric authentication module 17 is integrated in the SRP 311 which communicates with the control processor 20. Audio data is passed to the SRP 311 along a signal path from the microphone interface 312 to an audio interface in the codec 330 and a corresponding audio interface in the SRP 311. These audio interfaces are distinct from the audio interfaces between the codec 330 and the control processor 20 (i.e. via the mixer 14). As with the SRP 111 shown in FIG. 2, the signal path does not include the mixer 14. Thus the control processor 20 (and any malware running on it) is not able to inject audio data into the biometric authentication module 17. The only input signal supplied by the codec and used for the authentication process is that which is received at the microphone interface 312 (potentially modified by action of one or more DSPs, see below). SRP 311 may also comprise other inputs that may be directly coupled to other microphones, as discussed above with respect to FIG. 2, which may also contribute to the biometric authentication. SRP 311 may also comprise a mixer and signal gating module as discussed with respect to FIG. 2.

One or more DSPs may be provided in the signal path to condition the received signal prior to the biometric authentication module 17. For example, a DSP 132 may be provided in the signal path on the codec 330, or a DSP 132a may be provided in the SRP 311, or both. One of the DSPs 132, 132a may generate a voice activity detection signal VAD, as before, and provide the signal to the signal gating module 130 via the control link 131. In this way, the gating module 130 may be controlled to prevent audio signals reaching the mixer 14 when authentication is taking place on audio reaching the microphones without an explicit control signal BioRQ from the control processor 20. Such a situation may arise when the device 310 is in a low power state and requires secure authentication in order to change the power state (as described above). In the illustrated embodiment, the DSP 132a on the SRP 311 generates the VAD signal, and this is provided on the control link 131 via a suitable control interface. Alternatively, the DSP 132 on the codec 330 may generate the VAD signal.

The control processor 20 may request biometric authentication by generating a suitable control signal BioRQ, as before, and providing the BioRQ signal to the SRP 311. The BioRQ signal may also be provided to the signal gating module 130 via the control interfaces and the control link 131, to ensure that the microphone signals cannot be passed to the mixer 14 (i.e. and stored elsewhere) during an authentication process. As before, the BioRQ signal may require authentication in order to be processed (e.g. it may be encrypted or required to meet some defined rules), and an authentication module may be provided in the SRP 311 and/or the link 131 in the codec 330 in order to provide that authentication.

Audio data derived from the microphone signals is thus passed from the codec 330 to the SRP 311 via one or more dedicated audio interfaces distinct from those interfaces coupled to the mixer 14, and thence to the biometric authorization module 17. However, in some embodiments one or more wires in the interfaces, for example clock lines, may be shared between interfaces. Thus the interfaces may not be entirely distinct. However, in such embodiments data destined for the biometric authentication module 17 may be carried on a dedicated wire or other physical link within the interface (e.g. a pair of wires carrying a differential logic waveform). The biometric authentication module 17 may communicate its authentication result BioOK to the control processor 20 as before. The BioOK signal may be provided in an authenticatable form as before, for example configured by a FIDO signal authentication protocol. The BioOK signal may thence be provided to an eventual destination via a modem 21 or data interface 22. In some embodiments this result may also be communicated to processing or software operating in a trusted execution environment (TEE) on the control processor 20.

By using the one or more audio interfaces dedicated to the transmission of audio data to the biometric authentication module 17, rather than any audio interface coupled to the mixer 14, there is no opportunity for malware to inject signals into the input of to the biometric authorization module, for similar reasons as those regarding the embodiment illustrated in FIG. 2.

By using the control interface dedicated to the transmission of the signal gating control rather than one that might be influenced by malware in a non-secure part of the control processor 20, it can be ensured that the microphone signals are not captured by the malware for similar reasons as those detailed above regarding the embodiment illustrated in FIG. 2. The signal gating control may be ganged with the control of the biometric authentication to ensure the microphone signals do not pass through the mixer during biometric authentication, whether this authentication occurs due to a processor request BioRQ or some other stimulus such as a voice activity detect VAD.

Figure 3B:
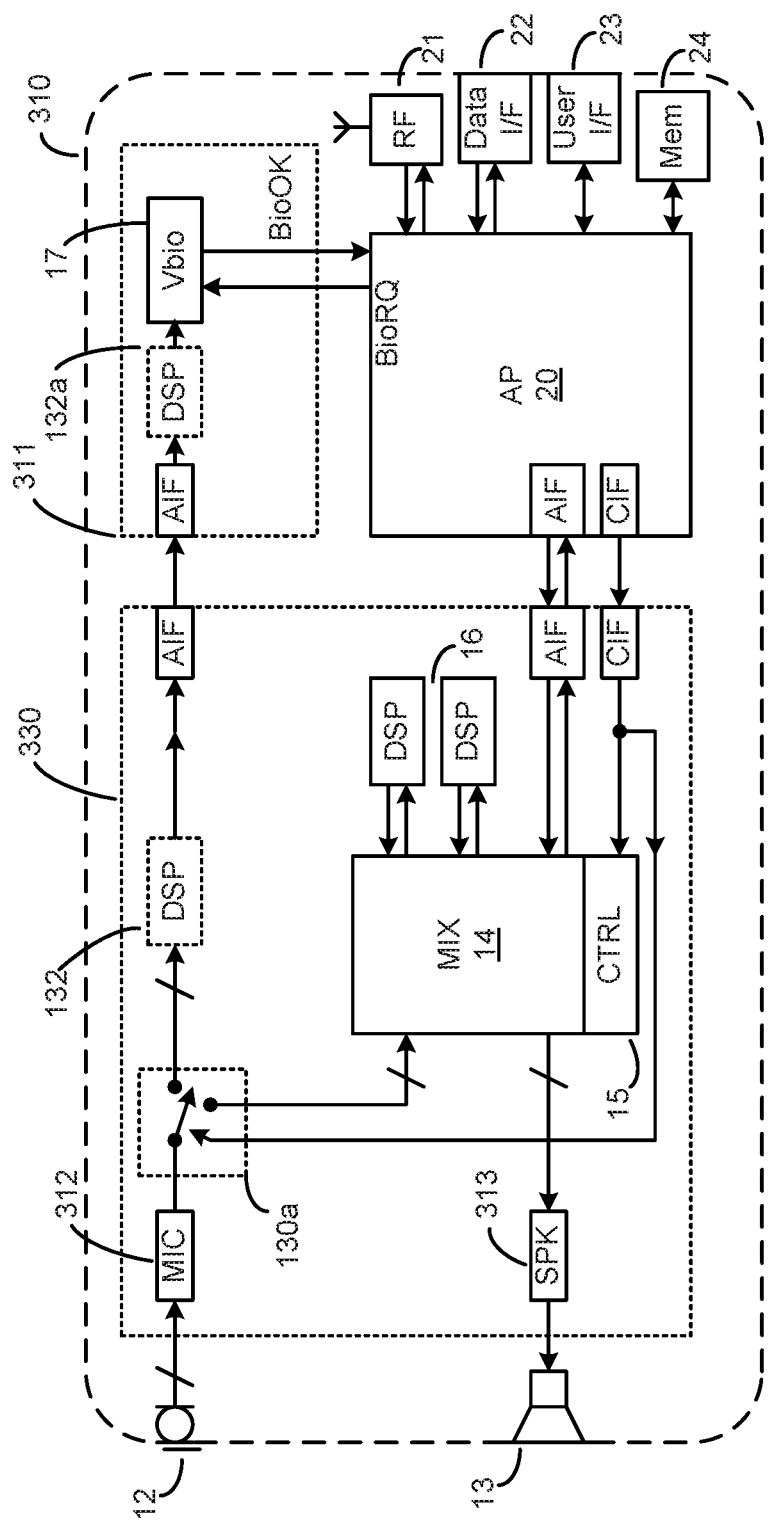

In some embodiments however, the overhead of the control interface may be undesirable, for example due to pin-count limits or cost. FIG. 3b illustrates an embodiment similar to FIG. 3a but with no control interface between the codec 330 and SRP 311. Also the signal gating module 130 previously illustrated in series between the microphone input(s) and the mixer is replaced by a modified gating module 130a illustrated as a double-throw switch which can couple the microphone signal either to the mixer or to the biometric audio interface, but not both. Thus at any time when the signal is coupled to the mixer, there is no signal forwarded to the biometric authentication module, and at any time when the signal is coupled to the biometric authentication module, there is no signal forwarded to the biometric authentication module.

Signal gating module 130a may be implemented for example using pass gates, or equivalent combinatorial logic gates. In some embodiments the switching of the paths may be implemented by otherwise disabling respective signal paths, for instance by disabling the inputs to DSP 132 if present or by disabling the circuitry of processor 132, which may also reduce power consumption as well as interrupt the signal path. Thus, despite any possible malware influence on the control signal for the gating module, in this embodiment it is still impossible for any signal sample used for biometric authentication to also pass though the mixer.

The discussion above has focussed on the use of biometric authentication to authorise a restricted operation such as a financial transaction. However, the disclosure is not so limited and those skilled in the art will appreciate that authentication may be provided or requested for any reason. For example, biometric authentication of the user may be required for one or more of: carrying out a financial transaction using the device (e.g. via a banking or wallet app installed on the device); accessing encrypted communications such as encrypted e-mails; changing security settings of the device; allowing access to the device via a lock screen; turning the device on, or otherwise changing a power mode of the device (such as waking from sleep mode). The set of operations requiring biometric authentication may be configurable by the user, so as to apply a level of security that the user is comfortable with.

Further, the devices described above have focussed primarily on voice biometric authentication based on audio input received from one or more microphones. However, those skilled in the art will appreciate that the invention may be applied in a more general sense to any biometric authentication system in which malware can hijack the signal path from an input device to a biometric authentication device. For example, the invention is also applicable to iris or retinal recognition (in which case the input device or devices are cameras, and the authentication module carries out iris or retinal recognition); fingerprint recognition (in which case the input device or devices are cameras or fingerprint detectors, and the authentication module carries out fingerprint recognition); palm vein recognition (in which case the input device or devices are cameras, and the authentication module carries out palm vein pattern recognition); and face recognition (in which case the input device or devices are cameras, and the authentication module carries out face recognition). In these embodiments, imaging signals (i.e. as obtained from one or more cameras) may be routed to multiple components within the electronic device, such as an AP, display circuitry, etc, as well as a biometric authentication module.

The invention thus provides apparatus and methods that ensure biometric authentication can be carried out effectively on biometric signals received at one or more input devices (such as microphones, etc), without injection of signals aimed at "spoofing" the authentication algorithm. Additionally, the invention provides apparatus and methods that prevent unauthorised copying of biometric signals that may be used in later spoofing attacks.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may comprise or be comprised in an electronic device, especially a portable and/or battery powered electronic device such as a mobile telephone, an audio player, a video player, a PDA, a wearable device, a mobile computing platform such as a laptop computer or tablet and/or a games device, remote control device or a toy, for example, or alternatively a domestic appliance or controller thereof including a domestic temperature or lighting control system or security system, or robot.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. An electronic device, comprising:
   one or more input devices, for receiving biometric input from a user and generating one or more biometric input signals;
   an applications processor;
   a mixer configurable by the applications processor to provide a first signal path between one or more of the input devices and the applications processor; and
   a biometric authentication module coupled to the one or more input devices via a second signal path that does not include the mixer, for performing authentication of at least one of the one or more biometric input signals.

2. The electronic device according to claim 1, wherein the biometric authentication module is configured to perform an authentication algorithm based on stored identification characteristics of the user, and a signal received at an input of the biometric authentication module.

3. The electronic device according to claim 2, wherein the second signal path is configured such that the signal received at the input of the biometric authentication module is based solely on the at least one of the one or more biometric input signals.

4. The electronic device according to claim 1, further comprising:
a gating block, coupled between the one or more input devices and the mixer, for disabling the first signal path upon receipt of one or more control signals.

5. The electronic device according to claim 4, wherein the one or more control signals comprise a first control signal provided to the gating block upon entry to a biometric authentication mode.

6. The electronic device according to claim 5, wherein the first control signal is provided via a control link between the gating block and the applications processor.

7. The electronic device according to claim 6, wherein the control link is between the gating block and a trusted execution environment of the applications processor.

8. The electronic device according to claim 5, further comprising an authentication block for authenticating the first control signal.

9. The electronic device according to claim 4, wherein the one or more control signals comprise a second control signal generated upon initial detection of biometric input activity by the one or more input devices.

10. The electronic device according to claim 9, further comprising a signal processor coupled in the second signal path between the one or more input devices and the biometric authentication module, for generating the second control signal upon initial detection of biometric input activity by the one or more input devices.

11. The electronic device according to claim 4, wherein the gating block is operable as a dual-throw switch coupled to the first signal path and the second signal path.

12. The electronic device according to claim 11, wherein the gating block is coupled to both the first signal path and the second signal path and is operable as a dual-throw switch with output poles coupled to the first signal path and the second signal path respectively.

13. The electronic device according to claim 1, wherein the one or more input devices comprise one or more microphones, wherein the biometric input signal comprises an audio biometric input signal, and wherein the biometric authentication module is a voice biometric authentication module.

14. The electronic device according to claim 1, wherein the biometric authentication module is configured to provide an authentication result to the applications processor.

15. The electronic device according to claim 14, wherein the authentication result is configured according to a FIDO protocol.

16. The electronic device as claimed in claim 1, wherein the electronic device is at least one of: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; and a robot.

17. A method in an electronic device, comprising:
receiving biometric input from a user at one or more input devices of the electronic device and generating one or more biometric input signals;
configuring a mixer to provide a first signal path between one or more of the input devices and an applications processor of the electronic device;
providing a second signal path between one or more of the input devices and a biometric authentication module of the electronic device, wherein the second signal path does not include the mixer; and
in the biometric authentication module, performing authentication of at least one of the one or more biometric input signals.

18. An integrated circuit comprising:
a first set of one or more inputs for receiving biometric input signals from one or more input devices;
a second set of one or more inputs for receiving other input signals;
a first data interface, coupled to both sets of inputs via a first, configurable signal path, for outputting the biometric input signals or the other input signals from the integrated circuit; and
a second data interface, coupled to the first set of inputs via a second signal path, for outputting only the biometric input signals from the integrated circuit.

19. The integrated circuit according to claim 18, further comprising a mixer coupled in the first signal path.

20. The integrated circuit according to claim 18, further comprising one or more signal processors selectively configurable into the first signal path.

21. The integrated circuit according to claim 18, further comprising a gating block, coupled between the first set of one or more inputs and the first data interface, for disabling the first signal path upon receipt of one or more control signals.

22. The integrated circuit according to claim 21, wherein the one or more control signals comprise a first control signal provided to the gating block upon entry to a biometric authentication mode.

23. The integrated circuit according to claim 22, further comprising a control interface upon which the first control signal is provided.

24. The integrated circuit according to claim 22, further comprising a data authentication block for authenticating the first control signal.

25. The integrated circuit according to claim 21, wherein the one or more control signals comprise a second control signal generated upon initial detection of biometric input activity by the one or more input devices.

26. The integrated circuit according to claim 25, further comprising a signal processor coupled in the second signal path between the first set of one or more inputs and the second data interface, for generating the second control signal upon initial detection of biometric input activity at the first set of one or more inputs.

27. The integrated circuit according to claim 21, wherein the gating block is operable as a dual-throw switch coupled to the first signal path and the second signal path.

28. The integrated circuit according to claim 27, wherein the gating block is coupled to both the first signal path and the second signal path and is operable as a dual-throw switch with output poles coupled to the first signal path and the second signal path respectively.

29. An electronic device comprising:
an integrated circuit comprising:
a first set of one or more inputs for receiving biometric input signals from one or more input devices;
a second set of one or more inputs for receiving other input signals;
a first data interface, coupled to both sets of inputs via a first, configurable signal path, for outputting the biometric input signals or the other input signals from the integrated circuit; and a second data interface, coupled to the first set of inputs via a second signal path, for outputting only the biometric input signals from the integrated circuit;

one or more input devices, for receiving biometric input from a user and generating the biometric input signals, said input devices coupled to one or more of the first set of inputs; and a processor comprising a biometric authentication module, the biometric authentication module configured to perform authentication only on the biometric input signals received via the second data interface, or signals derived therefrom.

30. The electronic device as claimed in claim 29, wherein the electronic device is at least one of: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; and a robot.

31. A method in an integrated circuit, comprising:
receiving biometric input signals from one or more input devices on a first set of one or more inputs;
receiving other input signals on a second set of one or more inputs;
outputting the biometric input signals or the other input signals from the integrated circuit via a first data interface, coupled to both sets of inputs via a first, configurable signal path; and
outputting only the biometric input signals from the integrated circuit via a second data interface, coupled to the first set of inputs via a second signal path.

32. A speaker recognition processor comprising:
one or more inputs for receiving voice biometric input signals from one or more microphones;
a data interface, coupled to the one or more inputs via a first, configurable signal path, for outputting the voice biometric input signals from the speaker recognition processor to a processor; and
a voice biometric authentication module, coupled to the one or more inputs via a second, signal path, for performing authentication only on voice biometric input signals received at the one or more inputs, or signals derived therefrom.

33. The speaker recognition processor according to claim 32, further comprising a mixer coupled in the first signal path.

34. The speaker recognition processor according to claim 33, further comprising one or more additional inputs coupled to the mixer, and wherein the mixer is configurable to route signals received at said one or more additional inputs to the data interface.

35. The speaker recognition processor according to claim 32, further comprising one or more signal processors selectively configurable into the first signal path.

36. The speaker recognition processor according to claim 32, further comprising a gating block, coupled between the one or more inputs and the data interface, for disabling the first signal path upon receipt of one or more control signals.

37. The speaker recognition processor according to claim 36, wherein the one or more control signals comprise a first control signal provided to the gating block upon entry to a biometric authentication mode.

38. The speaker recognition processor according to claim 37, further comprising a control interface upon which the first control signal is provided.

39. The speaker recognition processor according to claim 37, further comprising an authentication block for authenticating the first control signal.

40. The speaker recognition processor according to claim 36, wherein the one or more control signals comprise a second control signal generated upon initial detection of voice activity by the one or more microphones.

41. The speaker recognition processor according to claim 40, further comprising a signal processor coupled in the second signal path between the one or more inputs and the second data interface, for generating the second control signal upon initial detection of voice activity at the one or more inputs.

42. The speaker recognition processor according to claim 36, wherein the gating block is operable as a dual-throw switch coupled to the first signal path and the second signal path.

43. The speaker recognition processor according to claim 42, wherein the gating block is coupled to both the first signal path and the second signal path and is operable as a dual-throw switch with output poles coupled to the first signal path and the second signal path respectively.

44. An electronic device comprising:
a speaker recognition processor according to claim 32;
one or more microphones, for receiving voice input from a user and generating the voice biometric input signals; and
a processor coupled to the data interface.

45. The electronic device as claimed in claim 44, wherein the electronic device is at least one of: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; and a robot.

46. A method in a speaker recognition processor, comprising:
receiving voice biometric input signals from one or more microphones via one or more inputs;
outputting the voice biometric input signals from the speaker recognition processor to a processor via a data interface, coupled to the one or more inputs via a first, configurable signal path; and
performing authentication only on voice biometric input signals received at the one or more inputs, or signals derived therefrom, in a voice biometric authentication module coupled to the one or more inputs via a second signal path.

47. An integrated circuit comprising:
one or more inputs for receiving biometric input signals;
a biometric authentication module, coupled to the one or more inputs via a first signal path, for performing authentication on the biometric input signals or signals derived therefrom; and
a command input, configured to disable all signal paths to the biometric authentication module with the exception of the first signal path upon entry to a biometric authentication mode.

48. The integrated circuit according to claim 47, further comprising a gating module coupled to the one or more inputs and the command input, the gating module being operable to disable all signal paths to the biometric authentication module with the exception of the first signal path upon receipt of a control signal on the command input.

49. The integrated circuit according to claim 48, wherein the gating module is operable as a dual-throw switch coupled between the one or more inputs and the biometric authentication module, configured to enable only the first signal path upon receipt of a control signal on the command input.

50. An electronic device comprising:
- an integrated circuit comprising:
  - one or more inputs for receiving biometric input signals;
  - a biometric authentication module, coupled to the one or more inputs via a first signal path, for performing authentication on the biometric input signals or signals derived therefrom; and
  - a command input, configured to disable all signal paths to the biometric authentication module with the exception of the first signal path upon entry to a biometric authentication mode;
- one or more input devices, for receiving biometric input from a user and generating the biometric input signals; and
- a processor coupled to the data interface.

51. The electronic device according to claim 50, wherein the one or more input devices are microphones, and wherein the biometric input signals are voice signals.

52. The electronic device as claimed in claim 50, wherein the electronic device is at least one of: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; and a robot.

* * * * *

UNITED STATES PATENT AND TRADEMARK OFFICE
CERTIFICATE OF CORRECTION

PATENT NO. : 10,691,780 B2
APPLICATION NO. : 15/667849
DATED : June 23, 2020
INVENTOR(S) : Saunders et al.

Page 1 of 1

It is certified that error appears in the above-identified patent and that said Letters Patent is hereby corrected as shown below:

On the Title Page

1. In Column 1, below Item (60), insert Item -- (30) Foreign Application Priority Data Oct. 05, 2016 (GB) .............. 1616899.9 --, therefor.

In the Specification

2. In Column 6, Line 25, delete "control circuitry" and insert -- control circuitry 15 --, therefor.

3. In Column 8, Line 60, delete "device" and insert -- device 10 --, therefor.

Signed and Sealed this
Twenty-second Day of November, 2022

Katherine Kelly Vidal
*Director of the United States Patent and Trademark Office*